(No Model.)
T. A. BLAKE.
CHILI MILL
No. 422,706. Patented Mar. 4, 1890.
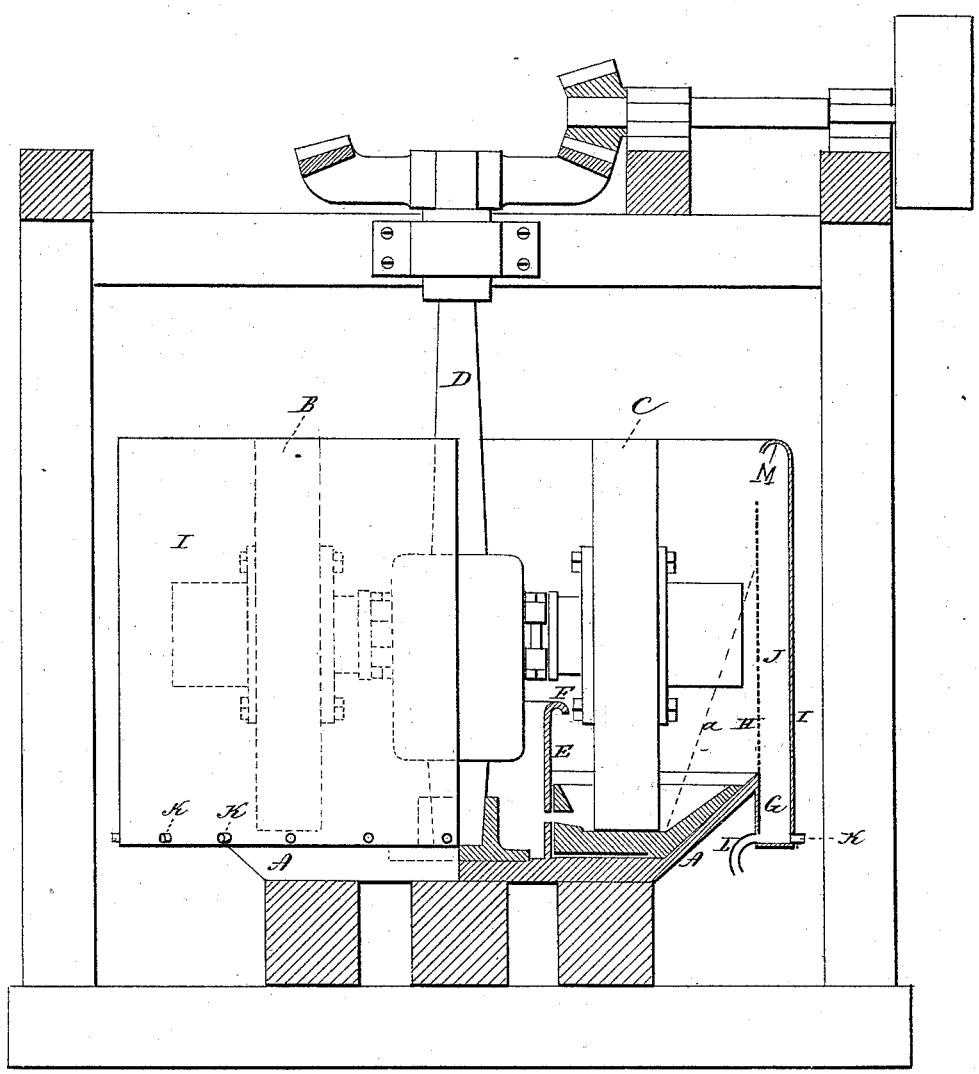

UNITED STATES PATENT OFFICE.

THEODORE A. BLAKE, OF NEW HAVEN, CONNECTICUT.

CHILI MILL.

SPECIFICATION forming part of Letters Patent No. 422,706, dated March 4, 1890.

Application filed July 1, 1889. Serial No. 316,227. (No model.)

*To all whom it may concern:*

Be it known that I, THEODORE A. BLAKE, of New Haven, in the county of New Haven and State of Connecticut, have invented a new Improvement in Chili Mills; and I do hereby declare the following, when taken in connection with accompanying drawing and the letters of reference marked thereon, to be a full, clear, and exact description of the same, and which said drawing constitutes part of this specification and represents a vertical central section showing the mill partly in side view.

This invention relates to an improvement in that class of mills in which a circular pan is arranged in a horizontal plane with a revolving vertical central shaft carrying radial axles, upon which wheels are arranged so as to roll around in said pan, the said shaft being the center of their traveling movement, and so as to crush the material which may be introduced into the pan, a flow of water into the pan being maintained during the crushing operation, the pan provided with a perforated vertical wall extending from its outer edge upward and forming a chamber within which the said wheels roll, and so that the material introduced to the pan to be ground will flow with the water through the perforations in the said outside wall, commonly called "Chili mills." As the crushing-wheels roll round in the pan they force the water in advance of them and produce a wave, which, under the centrifugal force of the traveling rollers, flows up onto the vertical perforated wall and through the perforations, taking the fine particles of the ground material with the water to the discharge. A difficulty is experienced in this mill from the fact of the stopping or clogging of the perforations or adherence of the ground particles to the inner surface of the perforated wall.

The object of my invention is to overcome this difficulty; and it consists in combining with the vertical perforated wall around the pan a close wall outside the said perforated wall, so as to form a narrow concentric space around the pan, the two walls rising from a corresponding concentric channel below, and so that the wave produced by the grinding-wheel will cause the space between the said walls to be filled with water, and so that as the wheels pass on the water will return through the perforations to a considerable extent, and so as to remove the particles which may have clogged the perforations from the inside, and as more fully hereinafter described.

A represents the pan, which is of usual construction; B C, the two grinding-wheels, arranged upon self-adjusting axes radiating from a vertical central shaft D, to which power is applied to cause the wheels to travel in a circular path in the pan. The details of construction of this part of the mill are too well known to require particular description. Upon the inner edge of the pan in which the wheels travel a vertical wall E rises, its upper edge turned inward toward the wheels as at F, so as to form an overhanging downwardly-turned flange around the inner edge of the pan. Around the outer edge of the pan is a concentric channel G, which extends downward from the upper edge of the pan. From the inner side of this channel—that is, the outer edge of the pan—is a concentric vertical wall H, perforated or made from woven wire, the perforations or mesh being of a size corresponding to the work required. On the outer edge of the channel is a vertical close wall I, the lower part of which wall may form the outer side of the channel G. This wall extends upward and so as to form a narrow concentric space J between it and the perforated wall H, into which water may flow through the said perforated wall J. The channel G is constructed with outlets K at suitable distances for the escape of the overflow.

In operation the material to be ground is placed in the pan, with the usual supply of water thereto. As the grinding-wheels travel around the pan they produce a wave, which will rise upon the wall H, say, as indicated by a broken line *a*. As the material becomes ground to the requisite fineness it rises with this wave. The water with the particles it carries flows through the perforated wall H into the space J between, and fills that space. As the wheels advance the wave falls. The water from the space J, which is above the channel G, will then return through the perforations in the wall H to the pan. Thus will be produced an outward and inward flow of water through the perforated wall H which will keep the perforations clear and the wall free from obstructions, which would remain were there no return flow of water. The greater portion of the particles which have passed through the perforations will readily settle into the channel G. The outlets K being open, the water flows through those outlets, carrying the particles which have settled into the channel with it and into any suitable receptacle provided for the ground material or for further treatment, as the case may be.

To facilitate the exit and also to clear the channel from obstructions, a forced circulation is produced in the channel by means of water-inlets L upon the side of the channel opposite the outlets K. This forced circulation serves to clear the channel from the ground material which would naturally settle therein.

The inward turning of the inner wall E causes the wave which would rise upon that wall to stop when it reaches the flange F and return to the pan, and this being lower than upon the outer side prevents the rise upon that side, which might otherwise occur, and consequently throws the wave to a greater extent upon the opposite side. The outer wall should also be provided with an inwardly turned flange M around its upper edge, as shown, which will prevent the possibility of the wave rising so as to overflow the outer wall.

I claim—

1. In a Chili mill, substantially such as described, the combination therewith of a channel around and below the outer edge of the pan, a perforated wall rising from the inner side of said channel upon the edge of the pan, with a surrounding close wall rising from the outer side of the channel and forming a concentric space between said outer close and inner perforated wall, substantially as and for the purpose described.

2. In a mill substantially such as described, the combination therewith of a channel around and below the outer edge of the pan, a perforated wall rising from the inner side of said channel and upon the edge of the pan, with a surrounding close wall rising from the outer side of the channel and forming a concentric space between said outer close and inner perforated wall, and a wall upon the inner edge of the pan extending upward, its upper edge turned over and inward, substantially as described.

3. In a Chili mill, substantially such as described, the combination therewith of a channel around and below the outer edge of the pan, a perforated wall rising from the inner side of said channel upon the edge of the pan, with a surrounding close wall rising from the outer side of the channel and forming a concentric space between said outer close and inner perforated wall, the channel provided with outlets near its bottom and an inlet into the opposite side of the channel adapted to permit a forced flow of water into said channel and toward the said outlets, substantially as described.

THEODORE A. BLAKE.

Witnesses:
JOHN E. EARLE,
FRED C. EARLE.